(12) United States Patent
Urano et al.

(10) Patent No.: US 10,759,425 B2
(45) Date of Patent: Sep. 1, 2020

(54) AUTONOMOUS DRIVING SYSTEM

(71) Applicant: TOYOTA JIDOSHA KABUSHIKI KAISHA, Toyota-shi, Aichi-ken (JP)

(72) Inventors: Hiromitsu Urano, Numazu (JP); Bunyo Okumura, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 198 days.

(21) Appl. No.: 15/877,476

(22) Filed: Jan. 23, 2018

(65) Prior Publication Data

US 2018/0208198 A1 Jul. 26, 2018

(30) Foreign Application Priority Data

Jan. 25, 2017 (JP) ................. 2017-011132

(51) Int. Cl.
*B60W 30/16* (2020.01)
*G05D 1/00* (2006.01)
*B60W 60/00* (2020.01)
*G05D 1/02* (2020.01)
*B60W 50/00* (2006.01)

(52) U.S. Cl.
CPC .......... *B60W 30/16* (2013.01); *B60W 60/001* (2020.02); *G05D 1/0055* (2013.01); *G05D 1/0246* (2013.01); *G05D 1/0257* (2013.01); *B60W 2050/0063* (2013.01); *B60W 2540/10* (2013.01); *B60W 2540/12* (2013.01);
(Continued)

(58) Field of Classification Search
CPC ............ B60W 30/16; B60W 2556/20; B60W 60/001; B60W 2540/10; B60W 2540/12; B60W 2540/16; B60W 2540/18; B60W 2050/0063; G05D 1/0055; G05D 1/0246; G05D 1/0257
See application file for complete search history.

(56) References Cited

U.S. PATENT DOCUMENTS 9,043,073 B2 * 5/2015 Ricci ................. G06F 17/00
340/438
2012/0271500 A1 10/2012 Tsimhoni et al.
(Continued)

FOREIGN PATENT DOCUMENTS

DE 10 2012 205 343 A1 10/2012
DE 10 2015 200 522 A1 7/2016
(Continued)

*Primary Examiner* — Russell Frejd
(74) *Attorney, Agent, or Firm* — Sughrue Mion, PLLC

(57) ABSTRACT

An autonomous driving system includes at least one electronic control unit configured to set parameter among parameters, in response to an input by an occupant of a vehicle. The parameters are relevant to a traveling when the vehicle travels by an autonomous driving control. The at least one electronic control unit is configured to execute the autonomous driving control in accordance with the parameter. An autonomous driving system includes a canceling operation input unit to which the occupant inputs a canceling operation for the parameter. The at least one electronic control unit is configured to change the parameter to a regular value, when the occupant inputs the canceling operation to the canceling operation input unit after the parameter is set in response to the input by the occupant.

10 Claims, 2 Drawing Sheets

(52) U.S. Cl.
CPC ..... *B60W 2540/16* (2013.01); *B60W 2540/18* (2013.01); *B60W 2556/20* (2020.02)

(56) References Cited

U.S. PATENT DOCUMENTS

| | | |
|---|---|---|
| 2014/0012435 A1 | 1/2014 | Sugihara |
| 2016/0207528 A1 | 7/2016 | Stefan et al. |
| 2016/0207537 A1* | 7/2016 | Urano .................. B60W 50/16 |
| 2016/0264131 A1* | 9/2016 | Chan .................. B60W 30/025 |
| 2016/0325740 A1 | 11/2016 | Onica |
| 2017/0203766 A1* | 7/2017 | Prokhorov ............ B60W 40/09 |

FOREIGN PATENT DOCUMENTS

| | | |
|---|---|---|
| DE | 10 2016 212 055 A1 | 1/2018 |
| JP | 7192194 A | 7/1995 |
| JP | 10141967 A | 5/1998 |
| JP | 2003011806 A | 1/2003 |
| JP | 2008-189055 A | 8/2008 |
| JP | 2011189758 A | 9/2011 |
| JP | 2012-206551 A | 10/2012 |
| JP | 2013095212 A | 5/2013 |
| JP | 2015-189404 A | 11/2015 |
| WO | 2016052507 A1 | 4/2016 |

* cited by examiner

AUTONOMOUS DRIVING SYSTEM

INCORPORATION BY REFERENCE

The disclosure of Japanese Patent Application No. 2017-011132 filed on Jan. 25, 2017 including the specification, drawings and abstract is incorporated herein by reference in its entirety.

BACKGROUND

1. Technical Field

The disclosure relates to an autonomous driving system.

2. Description of Related Art

For example, Japanese Patent Application Publication No. 2008-189055 describes a device that automatically controls the inter-vehicular distance between a preceding vehicle and its own vehicle. In the device described in Japanese Patent Application Publication No. 2008-189055, it is possible to set a plurality of inter-vehicular distances through the operation by an occupant, for obtaining an inter-vehicular distance corresponding to an occupant's taste.

SUMMARY

In the device described in Japanese Patent Application Publication No. 2008-189055, through the operation by the occupant, it is possible to sequentially switch from a state where the inter-vehicular distance is long to a state where the inter-vehicular distance is short, in stages. In the case where the inter-vehicular distance is sequentially switched in this way, it is sometimes necessary to perform an operation for changing the inter-vehicular distance, multiple times, when the occupant restores the inter-vehicular distance to an original value.

An aspect provides an autonomous driving system that can easily change a parameter relevant to the traveling of the vehicle, to a regular value.

An aspect provides an autonomous driving system. The autonomous driving system according to the aspect includes at least one electronic control unit. The at least one electronic control unit is configured to set a parameter in response to an input by an occupant of a vehicle. The parameter is among a plurality of parameters different from each other. The parameters are relevant to a traveling of the vehicle when the vehicle travels by an autonomous driving control causing the vehicle to automatically travel in accordance with a predetermined traveling plan. The at least one electronic control unit is configured to execute the autonomous driving control in accordance with the parameter. The autonomous driving system includes canceling operation input unit to which the occupant inputs a canceling operation for the parameter. The at least one electronic control unit is configured to change the parameter to a predetermined regular value, when the occupant inputs the canceling operation to the canceling operation input unit after the parameter is set in response to the input by the occupant.

In the autonomous driving system, in the case where the parameter has been set in response to the input by the occupant, the parameter is changed to the regular value when the occupant inputs the canceling operation. That is, the occupant can change the parameter to the regular value, simply by the input of the canceling operation to the canceling operation input unit. Thus, in the autonomous driving system, it is possible to easily change the parameter relevant to the traveling of the vehicle, to the regular value.

In the aspect, the canceling operation input unit may be configured to function as an autonomous driving start operation input unit to which the occupant inputs an execution start operation for the autonomous driving control.

According to the above configuration, it is not necessary to provide the canceling operation input unit and the autonomous driving start operation input unit separately from each other. A single-piece member can be used as the two input units, and therefore, to simplify the configuration of the system.

In the aspect, the at least one electronic control unit may be configured to execute the autonomous driving control, in a case where the occupant performs the input to the autonomous driving start operation input unit while the at least one electronic control unit is not executing the autonomous driving control.

In the aspect, the at least one electronic control unit may be configured to store an order of setting of the parameters, when the at least one electronic control unit sets the parameters in response to the input by the occupant, and may be configured to change a last-time parameter to the predetermined regular value based on the order of the setting of the parameters, when the occupant inputs the canceling operation to the canceling operation input unit. The last-time parameter may be a parameter set by the occupant last time among the parameters.

According to the above configuration, by inputting the canceling operation, the occupant can change only the parameter set last time to the regular value.

In the aspect, the at least one electronic control unit may be configured to store a last-time parameter set by the at least one electronic control unit in response to the input by the occupant last time. The last-time parameter may be among the parameters. The at least one electronic control unit may be configured to change the last-time parameter to the predetermined regular value, when the occupant inputs the canceling operation to the canceling operation input unit.

In the aspect, the at least one electronic control unit may be configured to change the parameter set by the occupant, such that the parameter approaches the predetermined regular value with time, in a case where the at least one electronic control unit changes the parameter to the predetermined regular value while the at least one electronic control unit is executing the autonomous driving control.

According to the above configuration, the parameter is gradually changed to the regular value, and therefore, it is possible to prevent the traveling state of the vehicle from rapidly changing when the parameter is changed to the regular value.

In the aspect, the at least one electronic control unit may be configured to calculate a system reliability of the autonomous driving control, and may be configured not to change the parameter to the predetermined regular value, when the system reliability is lower than a predetermined value.

According to the above configuration, when the system reliability is low (when the system reliability is lower than the predetermined value), the parameter is not changed to the regular value, and the parameter set by the occupant is maintained. Thus, the autonomous driving system can change the parameter depending on the system reliability.

In the aspect, the parameters may be movement parameters relevant to a movement of the vehicle when the vehicle automatically travels by the autonomous driving control.

In the aspect, the movement parameters may include at least one of a position of the vehicle in a vehicle width direction of a lane on which the vehicle travels, a distance between the vehicle and a preceding vehicle traveling in front of the vehicle, an upper limit of a velocity, an acceleration or a deceleration of the vehicle in a traveling direction of the vehicle, and an upper limit of a lateral acceleration of the vehicle.

In the aspect, the autonomous driving system may include a sensor configured to recognize an external environment of the vehicle. The system reliability may include a reliability of a detection result of the sensor and a reliability of a determination of the at least one electronic control unit. The determination may be relevant to the autonomous driving control.

According to an aspect of the disclosure, it is possible to easily change the parameter relevant to the traveling of the vehicle, to the regular value.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
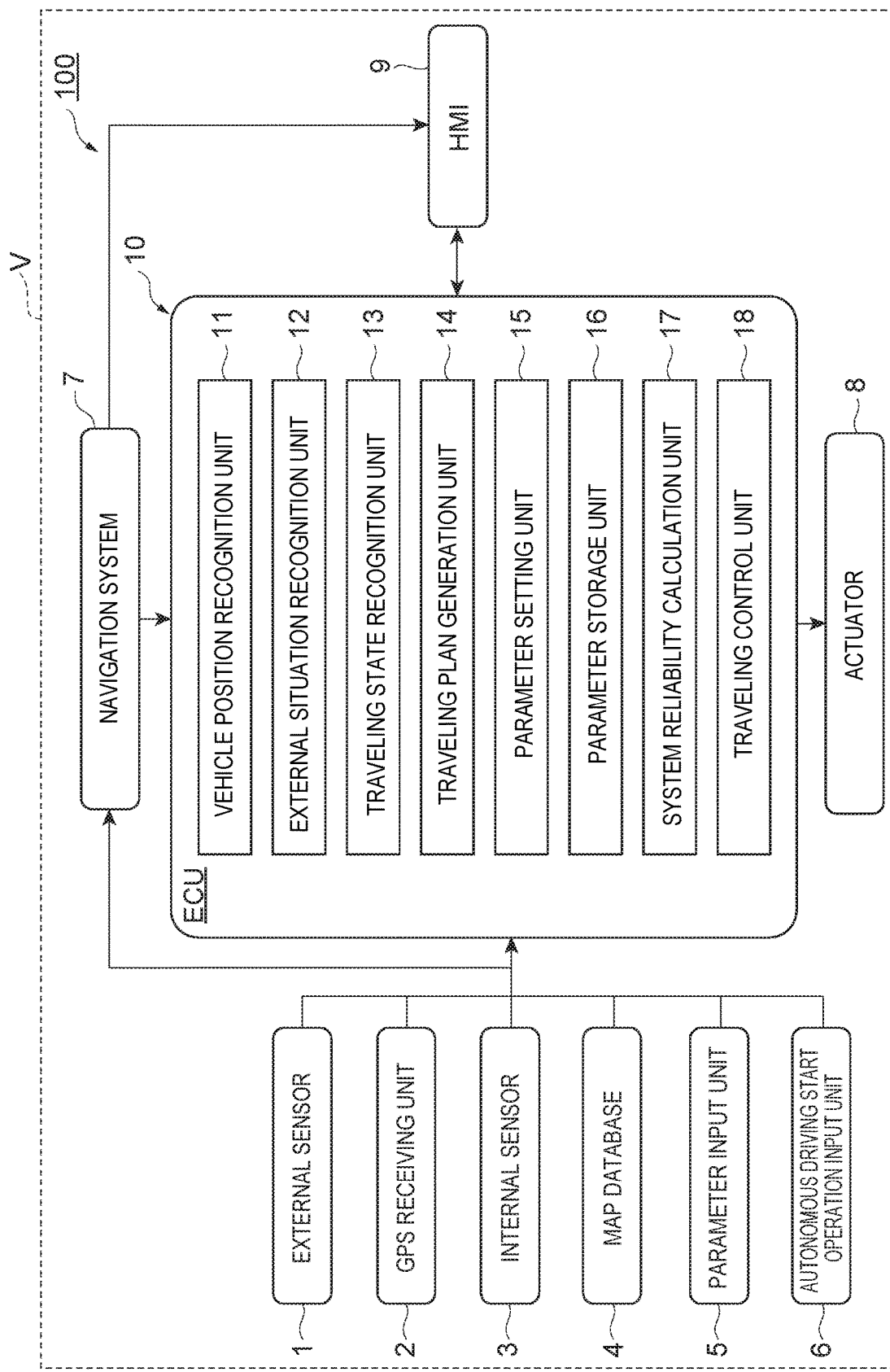
FIG. 1 is a diagram showing an outline configuration of an autonomous driving system according to an embodiment.

Hereinafter, an embodiment of the disclosure will be described with reference to the drawings. In the description of the drawings, identical reference characters are assigned to identical elements, and repetitive descriptions are omitted.

As shown in FIG. 1, an autonomous driving system 100 in the embodiment is mounted in a vehicle V such as a passenger car, and executes an autonomous driving control by which the vehicle V automatically travels in accordance with a previously generated traveling plan. A state where the autonomous driving control is being executed is a driving state where controls including a velocity control and steering control for the vehicle V are being executed by the autonomous driving system 100.

As shown in FIG. 1, the autonomous driving system 100 includes an ECU 10 for executing the autonomous driving control. The ECU 10 is an electronic control unit that includes a CPU [Central Processing Unit], a ROM [Read Only Memory], a RAM [Random Access Memory], a CAN [Controller Area Network] communication circuit, and the like. In the ECU 10, programs stored in the ROM are loaded on the RAM, and the programs loaded on the RAM are executed by the CPU, so that various functions are realized. The ECU 10 may be constituted by a plurality of electronic control units. The ECU 10 is connected with an external sensor 1, a GPS receiving unit 2, an internal sensor 3, a map database 4, a parameter input unit 5, an autonomous driving start operation input unit (a canceling operation input unit) 6, a navigation system 7, an actuator 8, and a HMI [Human Machine Interface] 9.

The external sensor 1 is a detection device that detects a situation in the periphery of the vehicle V. The external sensor 1 includes at least one of a camera and a radar sensor. The camera is an imaging device that images an external situation of the vehicle V. The camera is provided on the back side of a front windshield of the vehicle V. The camera sends imaging information relevant to the external situation of the vehicle V, to the ECU 10. The camera may be a monocular camera, or may be a stereo camera. The stereo camera includes two imaging units that are disposed such that a binocular parallax is reproduced. The imaging information of the stereo camera also includes information about a deep direction.

The radar sensor is a detection device that detects an obstacle in the periphery of the vehicle V using an electric wave (for example, a millimeter wave) or light. Examples of the radar sensor include a millimeter wave radar or a LIDAR [Light Detection and Ranging]. The radar sensor detects an obstacle by sending the electric wave or light to the periphery of the vehicle V and receiving an electric wave or light reflected by the obstacle. The radar sensor sends the detected obstacle information to the ECU 10. The obstacle includes fixed obstacles such as a guardrail and a building, as well as moving obstacles such as a pedestrian, a bicycle and another vehicle.

The GPS receiving unit 2, which is mounted in the vehicle V, functions as a position measurement unit that measures the position of the vehicle V. The GPS receiving unit 2 measures the position of the vehicle V (for example, the latitude and longitude of the vehicle V), by receiving signals from three or more GPS satellites. The GPS receiving unit 2 sends the measured positional information of the vehicle V, to the ECU 10.

The internal sensor 3 is a detection device that detects the traveling state of the vehicle V. The internal sensor 3 includes at least one of a speed sensor, an acceleration sensor and a yaw rate sensor. The speed sensor is a detector that detects the speed of the vehicle V. As the speed sensor, a wheel speed sensor that is provided for a wheel of the vehicle V, a drive shaft to rotate integrally with the wheel, or the like, and that detects the rotational speed of the wheel is used. The speed sensor sends the detected vehicle speed information to the ECU 10.

The acceleration sensor is a detector that detects the acceleration of the vehicle V. The acceleration sensor includes a front-back acceleration sensor that detects the acceleration of the vehicle V in a front-back direction of the vehicle V, and a lateral acceleration sensor that detects the lateral acceleration of the vehicle V. The acceleration sensor sends acceleration information of the vehicle V to the ECU 10. The yaw rate sensor is a detector that detects the yaw rate (rotational angular velocity) around the vertical axis at the centroid of the vehicle V. As the yaw rate sensor, for example, a gyroscope sensor can be used. The yaw rate sensor sends the detected yaw rate information of the vehicle V to the ECU 10.

The map database 4 is a database that stores map information. The map database 4 is configured in a HDD [Hard Disk Drive] mounted in the vehicle V. Examples of the map information include positional information of roads, information of road shapes, positional information of intersections and forks, and regulation speeds for roads. Examples of the information of road shapes include curves, types of straight sections, curvatures of curves, slopes (upward slopes or downward slopes) of road surfaces. The map database 4 may be stored in a server that can communicate with the vehicle V.

The parameter input unit 5 is an input device to which an occupant of the vehicle V inputs a parameter relevant to traveling. The parameter relevant to traveling is a parameter relevant to a traveling when the autonomous driving system 100 makes the vehicle V travel by the autonomous driving control. Details of the parameter will be described later. Specifically, the parameter input unit 5, for example, is an input button to which the occupant performs an input operation of the parameter. Alternatively, the parameter input unit 5 may be a steering sensor that detects a steering operation (steering angle, steering torque or the like) by a driver, when the parameter is input through the steering operation by the driver. The parameter input unit 5 may be a brake pedal sensor that detects a brake operation (stepping amount) by the driver, when the parameter is input through the brake operation by the driver. The parameter input unit 5 may be an accelerator pedal sensor that detects an accelerator operation (stepping amount or the like) by the driver, when the parameter is input through the accelerator operation by the driver. The parameter input unit 5 may be a shift sensor that detects a shift operation (an operation of switching of the traveling state) by the driver, when the parameter is input through the shift operation by the driver. The parameter input unit 5 outputs the result of the input by the occupant, to the ECU 10.

The autonomous driving start operation input unit 6 is an input device to which the occupant of the vehicle V inputs an execution start operation for the autonomous driving control by the autonomous driving system 100. Specifically, the autonomous driving start operation input unit 6, for example, is an input button to which the occupant inputs the execution start operation for the autonomous driving control. The autonomous driving start operation input unit 6 also functions as a canceling operation input unit to which the occupant of the vehicle V inputs a canceling operation for the parameter relevant to the traveling. That is, the autonomous driving start operation input unit 6 serves also as the canceling operation input unit for inputting the canceling operation for the parameter. The execution start operation for the autonomous driving control by the occupant and the canceling operation for the parameter are the same operation, and for example, are the depression of the input button. Whether the input operation is the execution start operation for the autonomous driving control or the canceling operation for the parameter is determined by the ECU 10, based on the timing when the input operation is performed to the autonomous driving start operation input unit 6. The autonomous driving start operation input unit 6 outputs the result of the input by the occupant, to the ECU 10.

The navigation system 7, which is mounted in the vehicle V, sets a target route on which the vehicle V travels by autonomous driving. The navigation system 7 computes a target route from the position of the vehicle V to a previously set destination, based on the destination, the position of the vehicle V measured by the GPS receiving unit 2 and the map information of the map database 4. The occupant of the vehicle V operates an input button (or a touch panel) provided in the navigation system 7, and thereby, the destination in the autonomous driving control is set. The target route is set such that lanes constituting a road are distinguished. The navigation system 7 can set the target route by a well-known technique. The navigation system 7 informs the driver of the target route, by an indication on a display device and a voice output from a speaker. The navigation system 7 outputs information of the target route for the vehicle V, to the ECU 10.

The actuator 8 is a device that executes a traveling control of the vehicle V. The actuator 8 includes at least a throttle actuator, a brake actuator and a steering actuator. In response to a control signal from the ECU 10, the throttle actuator controls the supply amount (throttle valve opening degree) of air to an engine, and controls driving power of the vehicle V. In the case where the vehicle V is a hybrid vehicle, in addition to the supply amount of air to the engine, a control signal from the ECU 10 is input to a motor as a dynamic power source, and driving power of the motor is controlled. In the case where the vehicle V is an electric vehicle, a control signal from the ECU 10 is input to a motor as a dynamic power source, and driving power of the motor is controlled. In these cases, the motor as a dynamic power source constitutes the actuator 8.

In response to a control signal from the ECU 10, the brake actuator controls a brake system, and controls braking force that is given to wheels of the vehicle V. As the brake system, a hydraulic brake system can be used. In response to a control signal from the ECU 10, the steering actuator controls the drive of an assist motor of an electric power steering system that controls steering torque. Thereby, the steering actuator controls the steering torque of the vehicle V.

The HMI 9 is an interface for the output and input of information between the driver and the autonomous driving system 100. For example, the HMI 9 includes a display device that displays image information to the driver and the like, a speaker that outputs voice, an input button or touch panel to which the driver performs an input operation, a voice input device, and the like. The HMI 9 sends information input by the driver, to the ECU 10. In response to a control signal from the ECU 10, the HMI 9 displays the image information on the display device, and outputs the voice from the speaker.

Next, a functional configuration of the ECU 10 will be described. The ECU 10 includes a vehicle position recognition unit 11, an external situation recognition unit 12, a traveling state recognition unit 13, a traveling plan generation unit 14, a parameter setting unit 15, a parameter storage unit (storage unit) 16, a system reliability calculation unit 17, and a traveling control unit 18. Some functions of the ECU 10 may be executed by a server that can communicate with the vehicle V.

The vehicle position recognition unit 11 recognizes the position of the vehicle V on a map, based on the positional information of the GPS receiving unit 2 and the map information of the map database 4. The vehicle position recognition unit 11 may recognize the position of the vehicle V by an existing SLAM technology, using the positional information of fixed obstacles such as utility poles, which is included in the map information of the map database 4, and the detection result of the external sensor 1.

The external situation recognition unit 12 recognizes the external situation of the vehicle V, based on the detection result of the external sensor 1. The external situation recognition unit 12 recognizes the external situation of the vehicle V that includes the position of an obstacle in the periphery of the vehicle V, by a well-known technique, based on a taken image of the camera and/or the obstacle information of the radar sensor.

The traveling state recognition unit 13 recognizes the traveling state of the vehicle V that includes the vehicle speed and orientation of the vehicle V, based on the detection result of the internal sensor 3. Specifically, the traveling state recognition unit 13 recognizes the vehicle speed of the vehicle V, based on the vehicle speed information of the speed sensor. The traveling state recognition unit 13 recognizes the orientation of the vehicle V, based on the yaw rate information of the yaw rate sensor.

The traveling plan generation unit 14 generates a traveling plan for the vehicle V, based on the target route set by the navigation system 7, the map information of the map database 4, the external situation of the vehicle V recognized by the external situation recognition unit 12 and the traveling state of the vehicle V recognized by the traveling state recognition unit 13. The traveling plan is a traveling plan in which the vehicle V reaches a previously set destination from the current position of the vehicle V.

The traveling plan includes target control values for the vehicle V corresponding to positions of the vehicle V on the target route. The positions on the target route are positions in an extending direction of the target route on the map. The positions on the target route mean set longitudinal positions that are set at a predetermined interval (for example, 1 m) in the extending direction of the target route. The target control values are values that are control targets for the vehicle V in the traveling plan. The target control values are set in association with the set longitudinal positions on the target route, respectively. The traveling plan generation unit 14 generates the traveling plan, by setting the set longitudinal positions with the predetermined interval on the target route and setting the target control value (for example, a target lateral position and a target vehicle speed) for each set longitudinal position. The set longitudinal position and the target lateral position may be set as a pair of positional coordinates. The set longitudinal position and the target lateral position mean longitudinal positional information and lateral positional information that are set as targets in the traveling plan.

The parameter setting unit 15 sets the parameter relevant to the traveling when the vehicle V travels by the autonomous driving control, based on the result of the input to the parameter input unit 5 by the occupant of the vehicle V. The parameter relevant to the traveling includes different kinds of parameters. The parameter relevant to the traveling is a parameter relevant to the movement of the vehicle. Examples of the parameter relevant to the movement of the vehicle include the velocity of the vehicle V and the offset amount from the lane center of a traveling lane for the vehicle V (the position of the vehicle V in the vehicle width direction of the vehicle V). Furthermore, the parameter relevant to the movement of the vehicle may include the inter-vehicular distance between a preceding vehicle and its own vehicle (the vehicle V), the acceleration or deceleration in the traveling direction of the vehicle V, the lateral acceleration (the acceleration of the vehicle V in the vehicle width direction of the vehicle V), and the like. The occupant of the vehicle V can set these parameters to suitable values, using the parameter input unit 5.

The parameter relevant to the traveling may further include a parameter relevant to the internal process of the autonomous driving system 100. Examples of the parameter relevant to the internal process include recognition accuracies of the vehicle position recognition unit 11, the external situation recognition unit 12 and the traveling state recognition unit 13, and the on-off of sensors that are used in the autonomous driving control (sensors that are included in the external sensor 1 and the like).

After the parameter is set through the input by the occupant, the parameter setting unit 15 changes the parameter set through the input by the occupant, to a previously determined regular value, in the case where the occupant inputs an canceling operation for the parameter to the autonomous driving start operation input unit 6 when the traveling control unit 18 is executing the autonomous driving control. Here, the regular value is a value that is previously set in the ECU 10 for executing the autonomous driving control, and for example, is the inter-vehicular distance between the preceding vehicle and its own vehicle.

The regular value may include a value specific to the current position of the vehicle V. Examples of the value specific to the current position of the vehicle V include the upper limit of the velocity of the vehicle V. The upper limit of the velocity of the vehicle V is changed depending on the condition of the traveling lane for the vehicle V, the condition of the road surface and the like, and therefore, is not always determined to a single value, depending on the place. The upper limit of the velocity of the vehicle V is changed depending on the condition of the traveling lane for the vehicle V, the condition of the road surface and the like. The parameter setting unit 15 can set the value specific to the current position of the vehicle V, for example, based on the recognition result of the external situation by the external situation recognition unit 12.

When changing the parameter to the regular value, the parameter setting unit 15 changes, to the regular value, a kind of parameter that is of the different kinds of parameters and that was set by the occupant last time, based on the order of setting of the parameters stored by the parameter storage unit 16.

For example, suppose that the parameter set by the occupant last time is a parameter for the velocity of the vehicle V and the offset amount from the lane center was further set before the setting of the parameter for the velocity of the vehicle V. In this case, the parameter setting unit 15 changes only the parameter for the velocity of the vehicle V, to the regular value, and maintains the offset amount from the lane center, at a value set by the occupant. For example, it is thought that the last parameter adjusted by the occupant (driver) is a tentatively adjusted parameter. Therefore, the parameter setting unit 15 changes only the last parameter adjusted, that is, only the parameter set last time, to the regular value. The last parameter adjusted by the occupant may include a parameter whose value was changed through an override operation by the driver.

In the case where the parameter setting unit 15 changes the parameter to the regular value when the traveling control unit 18 is executing the autonomous driving control, the parameter setting unit 15 changes the parameter set by the occupant, such that the parameter approaches the regular value with time. Herein, to change the parameter such that the parameter approaches the regular value with time means to gradually change the parameter set by the occupant to the regular value instead of switching the parameter to the regular value at one time.

In the case where the system reliability calculated by the system reliability calculation unit 17 is lower than a predetermined value, the parameter setting unit 15 does not change the parameter to the regular value, even when the occupant inputs the canceling operation for the parameter to the autonomous driving start operation input unit 6.

In the case where the occupant does not perform the setting of the parameter, the parameter setting unit 15 sets the parameter to the regular value.

The parameter storage unit 16 stores the order of setting of parameters set by the parameter setting unit 15 based on the operation by the occupant. The parameter storage unit 16 stores at least the kind of the parameter set last time, as the order of setting of the parameters.

The system reliability calculation unit 17 calculates the system reliability of the autonomous driving control. The system reliability is the degree of the certainty of the determination or performance in the autonomous driving control. A higher value of the system reliability indicates a more reliable determination or performance. The system reliability includes the reliability of a self-position, the reliability of recognition, the reliability of a course, and the like.

The reliability of the self-position is the degree of the certainty of the recognition of the position of the vehicle V. For example, in the case where the vehicle position recognition unit 11 detects the position of the vehicle V by dead reckoning based on the position measured by the GPS receiving unit 2, the system reliability calculation unit 17 calculates the reliability of the self-position such that the reliability of the self-position becomes low, when the detection of the position by dead reckoning is continued over a predetermined time or a predetermined distance. Alternatively, for example, the system reliability calculation unit 17 compares the position measured by the GPS receiving unit 2, to the position of the vehicle V acquired using a communication such as road-to-vehicle communication, and calculates the reliability of the self-position such that the reliability of the self-position is lower as the gap between both positions is larger.

Examples of the reliability of recognition includes the reliability of the recognition of the external situation, and the reliability of each sensor included in the external sensor 1 and the like.

The reliability of the recognition of the external situation is the degree of the certainty of the recognition of the external situation. The system reliability calculation unit 17 can calculate the reliability of the recognition of the external situation, for example, based on whether it is raining, whether fog has been generated, and the like. Specifically, for example, when the vehicle V travels in a place where it is raining, the system reliability calculation unit 17 sets the reliability of the recognition of the external situation to a lower value than when the vehicle V travels in a place where it is not raining. The system reliability calculation unit 17 can determine whether it is raining, for example, based on the detection result of a wiper sensor that detects whether a wiper mounted in the vehicle V is being actuated. In this case, the system reliability calculation unit 17 determines that it is raining, when the wiper sensor detects that the wiper is in an actuated state. Alternatively, for example, when the vehicle V travels in a place where fog has been generated, the system reliability calculation unit 17 sets the reliability of the recognition of the external situation to a lower value than when the vehicle V travels in a place where fog has not been generated. The system reliability calculation unit 17 can determine whether fog has been generated, for example, based on whether a fog lamp mounted in the vehicle V has been lighted. In this case, the system reliability calculation unit 17 determines that fog has been generated, when the fog lamp has been lighted.

The reliability of a sensor is the degree of the certainty of the detection by the sensor. For example, when the detection of a physical body by a sensor is continued, the system reliability calculation unit 17 sets the reliability of the sensor to a higher value than when the detection of a physical body is not continued. Alternatively, for example, in the case where the sensor as the object of the reliability calculation is a camera, the system reliability calculation unit 17 detects edges in the horizontal direction based on the state of change in luminance data in the vertical direction in an image taken by the camera. Then, when the number of the detected edges is equal to or more than a predetermined value, the system reliability calculation unit 17 sets the reliability of the camera to a lower value than when the number of the edges is less than the predetermined value. For example, in the case where the sensor as the object of the reliability calculation is a millimeter wave radar, the system reliability calculation unit 17 sets the reliability of the millimeter wave radar to a lower value when the road on which the vehicle V travels is complex, or sets the reliability of the millimeter radar to a lower value when the regulation speed is high. For example, the complexity of the road can be determined from the radius and curvature of the curve.

The reliability of a course is calculated based on whether the traveling environment is complex. The reliability of the course is calculated so as to be lower as the traveling environment is more complex. For example, when the course for the vehicle V is divided into a plurality of points (or sections), the system reliability calculation unit 17 sets the reliability of the course to a lower value as the distribution of the curvature is larger. Further, for example, the system reliability calculation unit 17 calculates the reliability of the course to a lower value as the speed of another vehicle traveling in the periphery of the vehicle V is higher and the distance in the vehicle width direction between the vehicle V and the other vehicle is shorter.

The system reliability calculation unit 17 may adopt the sum of the reliability of the self-position, the reliability of the recognition, the reliability of the course and the like described above, as the system reliability, and may adopt an average value or a representative value, as the system reliability.

In the case where the occupant inputs the execution start operation for the autonomous driving control to the autonomous driving start operation input unit 6 in a state where the traveling control unit 18 is not executing the autonomous driving control, the traveling control unit 18 executes the autonomous driving control. The traveling control unit 18 may execute the autonomous driving control when a predetermined condition is satisfied. The traveling control unit 18 executes the autonomous driving control including the velocity control and steering control for the vehicle V, based on the position of the vehicle V on the map recognized by the vehicle position recognition unit 11 and the traveling plan generated by the traveling plan generation unit 14. The traveling control unit 18 executes the autonomous driving control by sending a control signal to the actuator 8. When the traveling control unit 18 executes the autonomous driving control, the driving state of the vehicle V becomes an autonomous driving state. In the case where the occupant inputs the canceling operation for the parameter to the autonomous driving start operation input unit 6 when the traveling control unit 18 is executing the autonomous driving control, the traveling control unit 18 continues the execution of the autonomous driving control.

When executing the autonomous driving control, the traveling control unit 18 executes the autonomous driving control in accordance with the parameter set by the parameter setting unit 15. Thereby, for example, in the case where the occupant sets the parameter such as the offset amount from the lane center depending on the occupant's taste, the autonomous driving control is controlled in accordance with the parameter set depending on the occupant's taste.

Here, a behavior when the parameter set by the occupant is changed to the regular value in response to the operation of the autonomous driving start operation input unit 6 will be described. In the case where the occupant operates the autonomous driving start operation input unit 6 in a state where the traveling control unit 18 is not executing the autonomous driving control, the traveling control unit 18 regards the operation by the occupant as the execution start operation for the autonomous driving control, and starts the execution of the autonomous driving control in accordance with the parameter set by the parameter setting unit 15. Thereby, in the case where the occupant has set the parameter, the autonomous driving control is executed in accordance with the parameter set by the occupant. The setting of the parameter by the occupant can be performed both before the start of the execution of the autonomous driving control and during the execution of the autonomous driving control. In the case where the occupant sets the parameter during the execution of the autonomous driving control, the traveling control unit 18 executes the autonomous driving control in accordance with the parameter set by the parameter setting unit 15.

In the case where the occupant operates the autonomous driving start operation input unit 6 when the traveling control unit 18 is executing the autonomous driving control, the parameter setting unit 15 regards the operation by the occupant as the canceling operation for the parameter, and changes the parameter to the regular value. Further, in the case where the occupant operates the autonomous driving start operation input unit 6 when the traveling control unit 18 is executing the autonomous driving control, the traveling control unit 18 continues the execution of the autonomous driving control. In this case, since the parameter has been changed to the regular value by the parameter setting unit 15, the traveling control unit 18 executes the autonomous driving control in accordance with the parameter after the change. Thereby, for example, in the case where the vehicle V travels while being offset from the lane center in accordance with the setting of the parameter by the occupant, the offset amount from the lane center is changed to the regular value, by operating the autonomous driving start operation input unit 6 during the execution of the autonomous driving control.

Next, a flow of a process when the parameter setting unit 15 changes the parameter to the regular value during the execution of the autonomous driving control for the vehicle V in response to the operation by the occupant will be described. A process of a flowchart shown in FIG. 2 starts to be executed at the start of the execution of the autonomous driving control for the vehicle V, and is executed repeatedly while the autonomous driving control is being executed. In the flowchart shown in FIG. 2, when the process reaches END, the process starts from START again after a predetermined time. The occupant may set the parameter before the start of the execution of the autonomous driving control, or may set the parameter during the execution of the autonomous driving control.

Figure 2:
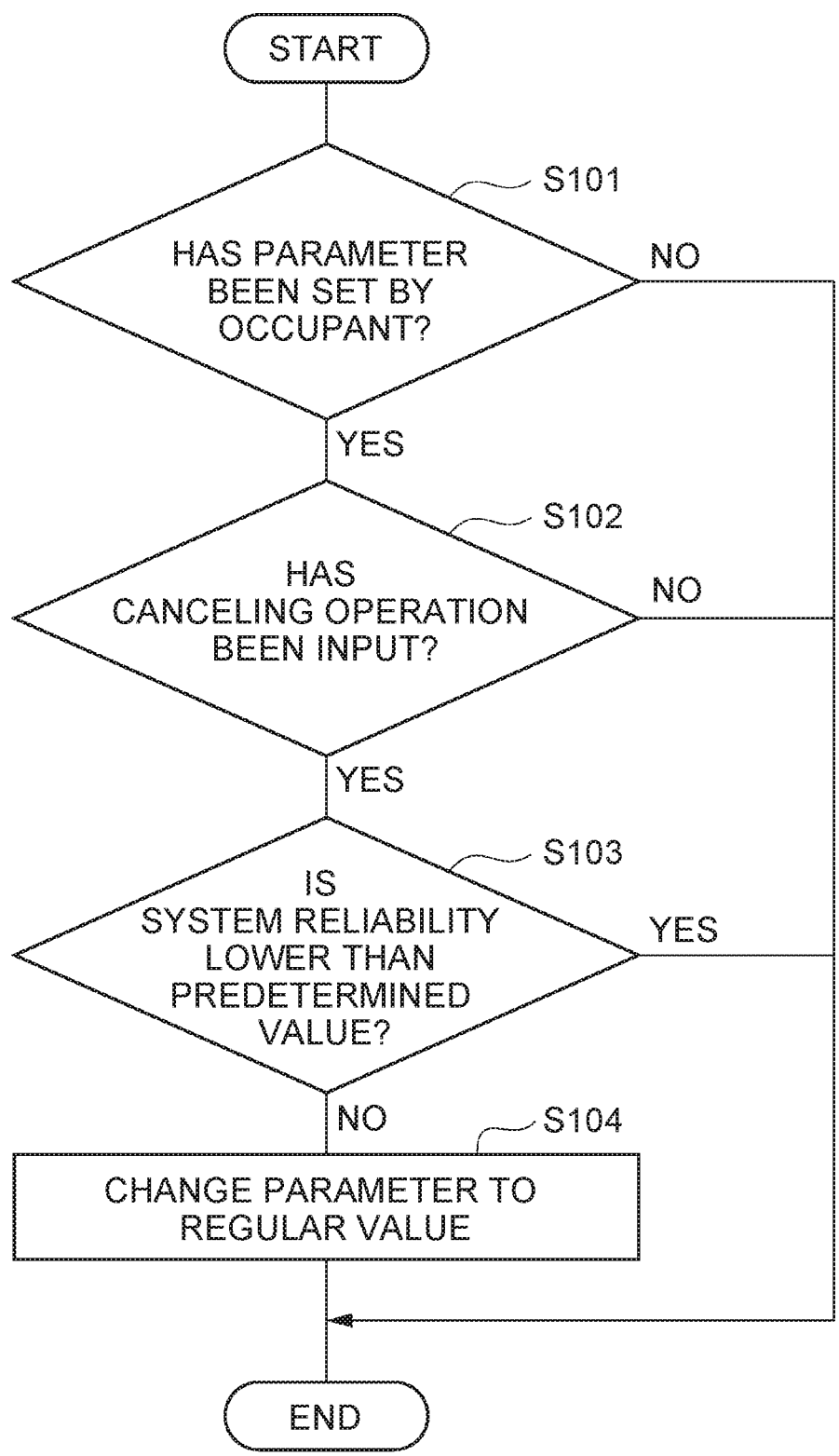
FIG. 2 is a flowchart showing a flow of a process for changing a parameter to a regular value during an autonomous driving control.

As shown in FIG. 2, at the start of the autonomous driving control or during the execution of the autonomous driving control, the parameter setting unit 15 determines whether the parameter has been set, based on the result of the input to the parameter input unit 5 by the occupant (S101). In the case where the parameter has not been set (S101: NO), the parameter setting unit 15 ends the present process.

In the case where the parameter has been set (S101: YES), the parameter setting unit 15 determines whether the occupant has input the canceling operation for the parameter to the autonomous driving start operation input unit 6 (S102). In the case where the canceling operation has not been input (S102: NO), the parameter setting unit 15 ends the present process. In the case where the canceling operation has been input (S102: YES), the parameter setting unit 15 determines whether the system reliability calculated by the system reliability calculation unit 17 is lower than a predetermined value (S103).

In the case where the system reliability is lower than the predetermined value (S103: YES), the parameter setting unit 15 ends the present process. In the case where the system reliability is not lower than the predetermined value (S103: NO), the parameter setting unit 15 changes the parameter set by the occupant, to the regular value (S104). On that occasion, the parameter setting unit 15 changes, to the regular value, a kind of parameter that is of the different kinds of parameters and that was set by the occupant last time, based on the order of setting of the parameters stored by the parameter storage unit 16. When changing the parameter set by the occupant to the regular value, the parameter setting unit 15 performs the change such that the parameter set by the occupant approaches the regular value with time.

The embodiment is configured as described above. In the case where the parameter has been set through the input by the occupant, the autonomous driving system 100 changes the parameter to the regular value, when the occupant inputs the canceling operation to the autonomous driving start operation input unit 6. That is, the occupant can change the parameter to the regular value, simply by inputting the canceling operation to the autonomous driving start operation input unit 6. Thus, in the autonomous driving system 100, it is possible to easily change the parameter relevant to the traveling of the vehicle V, to the regular value.

The autonomous driving start operation input unit 6 to which the execution start operation for the autonomous driving control is input serves also as the canceling operation input unit to which the canceling operation for changing the parameter is input. In this case, it is not necessary to provide the canceling operation input unit to which the canceling operation is input and the autonomous driving start operation input unit 6 to which the execution start operation for the autonomous driving control is input, separately from each other. Accordingly, a single-piece member can be used as the two units, and therefore, it is possible to simplify the configuration of the autonomous driving system 100.

When changing the parameter set by the occupant to the regular value, the parameter setting unit 15 changes only a kind of parameter set by the occupant last time, to the regular value. In this case, by inputting the canceling operation, the occupant can change only the parameter set last time, to the regular value. For example, it is thought that the last parameter set by the occupant is a tentatively set parameter. In such a case, by changing only the parameter set last time to the regular value, it is possible to change the parameter as the occupant intended.

In the case where the parameter setting unit 15 changes the parameter to the regular value when the autonomous driving control is being executed, the parameter setting unit 15 changes the parameter set by the occupant, such that the parameter approaches the regular value with time. In this way, the parameter is gradually changed to the regular value, and therefore, it is possible to prevent the traveling state of the vehicle V from rapidly changing when the parameter is changed to the regular value.

In the case where the system reliability calculated by the system reliability calculation unit 17 is lower than a predetermined value, the parameter setting unit 15 does not change the parameter to the regular value. Thereby, in the case where the system reliability is low (in the case where the system reliability is lower than the predetermined value), the parameter is not changed to the regular value, and the parameter set by the occupant is maintained. In this way, the autonomous driving system can change the parameter depending on the system reliability. For example, in the case where the system reliability is low, it is sometimes preferable to execute the autonomous driving control in accordance with the parameter set by the occupant. Therefore, in the case where the system reliability is lower than the predetermined value, the parameter set by the occupant is maintained, and thereby, it is possible to perform a suitable autonomous driving control corresponding to the system reliability.

The embodiment of the disclosure has been described above. The disclosure is not limited to the above embodiment. For example, the autonomous driving start operation input unit 6 to which the execution start operation for the autonomous driving control is input need not serve also as the canceling operation input unit to which the canceling operation for the parameter is input. The autonomous driving start operation input unit 6 and the canceling operation input unit may be provided separately. In the case where the canceling operation input unit is provided separately from the autonomous driving start operation input unit 6, the parameter setting unit 15 can execute the process of changing the parameter set by the occupant to the regular value, based on the input of the canceling operation to the canceling operation input unit, regardless of whether the autonomous driving control is being executed.

The change in the parameter to the regular value is not limited to the change in only a kind of parameter set by the occupant last time to the regular value, and the parameter setting unit 15 may change all parameters set by the occupant, to the regular values. When changing the parameter to the regular value, the parameter setting unit 15 may take no account of the system reliability.

The autonomous driving start operation input unit 6 is not limited to an input button that can be depressed, and various input devices such as a switch, a lever, a touch panel and a touch pad can be employed. In the case where the autonomous driving start operation input unit 6 and the canceling operation input unit are provided separately, various input devices such as an input button, a switch, a lever, a touch panel and a touch pad can be employed, as the canceling operation input unit, similarly to the autonomous driving start operation input unit 6.

What is claimed is:

1. An autonomous driving system comprising:
    at least one electronic control unit configured to
        set a first parameter in response to an input by an occupant of a vehicle, the first parameter being among a plurality of parameters which are different from each other, and the plurality of parameters being relevant to a traveling of the vehicle when the vehicle travels by an autonomous driving control, the autonomous driving control causing the vehicle to automatically travel in accordance with a predetermined traveling plan, and
        execute the autonomous driving control in accordance with the first parameter; and
    a canceling operation input unit to which the occupant inputs a canceling operation for the first parameter, wherein
        the at least one electronic control unit is configured to change the first parameter to a predetermined regular value, when the occupant inputs the canceling operation to the canceling operation input unit after the first parameter is set in response to the input by the occupant,
    wherein
    the at least one electronic control unit is configured to
        store an order of setting of the plurality of parameters, when the at least one electronic control unit sets the plurality of parameters in response to the input by the occupant, and
        change a last-time parameter to the predetermined regular value based on the order of the setting of the plurality of parameters, when the occupant inputs the canceling operation to the canceling operation input unit, the last-time parameter being a parameter set by the occupant last time among the plurality of parameters.

2. The autonomous driving system according to claim 1, wherein
    the canceling operation input unit is configured to function as an autonomous driving start operation input unit to which the occupant inputs an execution start operation for the autonomous driving control.

3. The autonomous driving system according to claim 2, wherein
    the at least one electronic control unit is configured to execute the autonomous driving control, in a case where the occupant performs the input to the autonomous driving start operation input unit while the at least one electronic control unit is not executing the autonomous driving control.

4. The autonomous driving system according to claim 1, wherein
    the at least one electronic control unit is configured to
        store the last-time parameter set by the at least one electronic control unit in response to the input by the occupant last time, and
        change the last-time parameter to the predetermined regular value, when the occupant inputs the canceling operation to the canceling operation input unit.

5. The autonomous driving system according to claim 1, wherein
    the at least one electronic control unit is configured to change the first parameter set by the occupant, such that the first parameter approaches the predetermined regular value with time, in a case where the at least one electronic control unit changes the first parameter to the predetermined regular value while the at least one electronic control unit is executing the autonomous driving control.

6. The autonomous driving system according to claim 1, wherein
    the at least one electronic control unit is configured to calculate a system reliability of the autonomous driving control, and is configured not to change the first parameter to the predetermined regular value, when the system reliability is lower than a predetermined value.

7. The autonomous driving system according to claim 6, further comprising a sensor configured to recognize an external environment of the vehicle, wherein
    the system reliability includes a reliability of a detection result of the sensor and a reliability of a determination of the at least one electronic control unit, the determination being relevant to the autonomous driving control.

8. The autonomous driving system according to claim 1, wherein
    each of the plurality of parameters are movement parameters relevant to a movement of the vehicle when the vehicle automatically travels by the autonomous driving control.

9. The autonomous driving system according to claim 8, wherein the movement parameters include at least one of a position of the vehicle in a vehicle width direction of a lane on which the vehicle travels, a distance between the vehicle and a preceding vehicle traveling in front of the vehicle, an upper limit of a velocity, an acceleration or a deceleration of the vehicle in a traveling direction of the vehicle, and an upper limit of a lateral acceleration of the vehicle.

10. An autonomous driving system comprising:

at least one electronic control unit configured to set a first parameter in response to an input by an occupant of a vehicle, the first parameter being among a plurality of parameters which are different from each other, and the plurality of parameters being relevant to a traveling of the vehicle when the vehicle travels by an autonomous driving control, the autonomous driving control causing the vehicle to automatically travel in accordance with a predetermined traveling plan, and execute the autonomous driving control in accordance with the first parameter; and a canceling operation input unit to which the occupant inputs a canceling operation for the first parameter, wherein the at least one electronic control unit is configured to change the first parameter to a predetermined regular value, when the occupant inputs the canceling operation to the canceling operation input unit after the first parameter is set in response to the input by the occupant, and the canceling operation input unit is configured to function as an autonomous driving start operation input unit to which the occupant inputs an execution start operation for the autonomous driving control.

* * * * *